US011801839B2

(12) United States Patent
Mizoguchi

(10) Patent No.: US 11,801,839 B2
(45) Date of Patent: Oct. 31, 2023

(54) VEHICLE TRAVEL CONTROL DEVICE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

(\*) Notice: Subject to any disclaimer, the term of this patent is extended or adjusted under 35 U.S.C. 154(b) by 90 days.

(21) Appl. No.: 17/212,556

(22) Filed: Mar. 25, 2021

(65) Prior Publication Data

US 2021/0316733 A1 Oct. 14, 2021

(30) Foreign Application Priority Data

Apr. 14, 2020 (JP) .................................. 2020-072241

(51) Int. Cl.
*B60W 30/18* (2012.01)
*B60W 40/02* (2006.01)
(Continued)

(52) U.S. Cl.
CPC .... *B60W 30/18163* (2013.01); *B60W 30/085* (2013.01); *B60W 30/146* (2013.01);
(Continued)

(58) Field of Classification Search
CPC ......... B60W 30/18163; B60W 30/085; B60W 30/146; B60W 40/02; B60W 2555/20; G06V 20/584; G06V 20/588
See application file for complete search history.

(56) References Cited

U.S. PATENT DOCUMENTS

2015/0100216 A1 4/2015 Rayes
2016/0214612 A1\* 7/2016 Kashiba ............. B60W 10/184
(Continued)

FOREIGN PATENT DOCUMENTS

JP 2015-223941 A 12/2015
JP 2016-533289 A 10/2016
JP 2019-051837 A 4/2019

OTHER PUBLICATIONS

Japanese Notice of Reasons for Refusal issued in corresponding Japanese Patent Application No. 2020-072241, dated Aug. 29, 2023, with English translation.

*Primary Examiner* — Jeff A Burke
*Assistant Examiner* — Mohamad O El Sayah
(74) *Attorney, Agent, or Firm* — McDermott Will & Emery LLP

(57) ABSTRACT

A vehicle travel control device includes a travel information collector and a travel control unit. The travel information collector is configured to collect travel environment information of a first vehicle. The travel environment information at least includes travel information of the first vehicle, ambient environment information of the first vehicle including external appearance information of a second vehicle, and first-vehicle lane information for recognizing a traveling lane of the first vehicle. The travel control unit is configured to perform travel control of the first vehicle based on the travel environment information. When the traveling lane of the first vehicle is a nonpriority lane and the first vehicle traveling on a nonpriority lane is to merge into a priority lane, the travel control unit is configured to perform control for causing the first vehicle to travel along a lane boundary line of the traveling lane, based on the travel environment information.

6 Claims, 4 Drawing Sheets

(51) Int. Cl.
*B60W 30/085* (2012.01)
*B60W 30/14* (2006.01)
*G06V 20/58* (2022.01)
*G06V 20/56* (2022.01)

(52) U.S. Cl.
CPC .......... *B60W 40/02* (2013.01); *G06V 20/584* (2022.01); *G06V 20/588* (2022.01); *B60W 2555/20* (2020.02)

(56) References Cited

U.S. PATENT DOCUMENTS

| | | | |
|---|---|---|---|
| 2018/0129206 A1* | 5/2018 | Harada | G05D 1/0088 |
| 2018/0194363 A1* | 7/2018 | Sugiura | G01C 21/3602 |
| 2019/0084619 A1 | 3/2019 | Mizoguchi | |
| 2019/0139415 A1* | 5/2019 | Sakaguchi | B60W 60/0015 |
| 2019/0180625 A1* | 6/2019 | Lee | G01S 19/14 |
| 2021/0253107 A1* | 8/2021 | Takamatsu | G08G 1/167 |

* cited by examiner

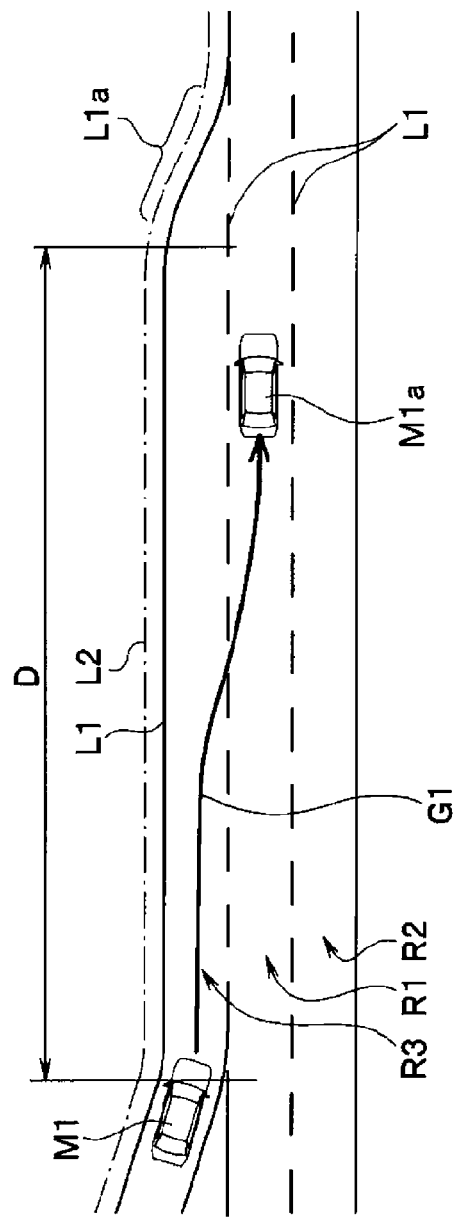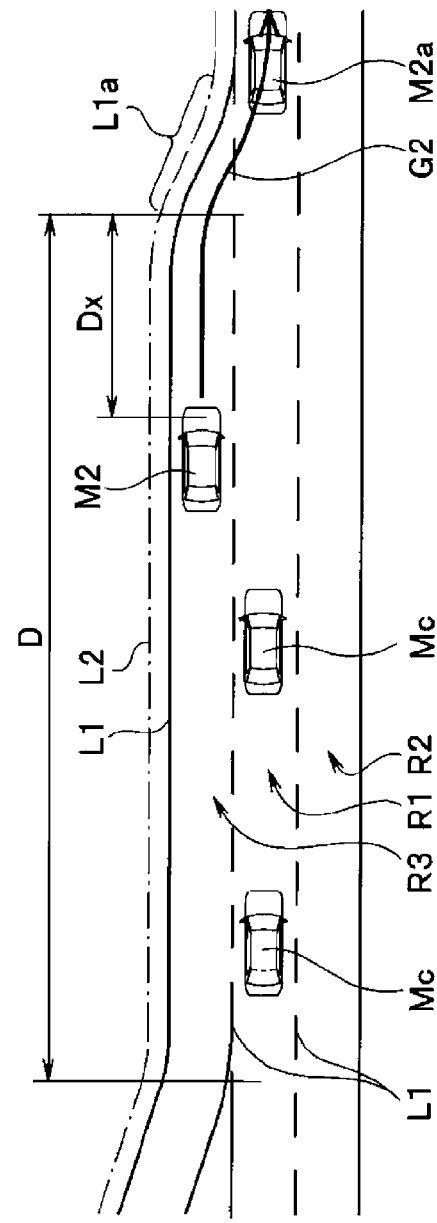

VEHICLE TRAVEL CONTROL DEVICE

CROSS-REFERENCE TO RELATED APPLICATIONS

The present application claims priority from Japanese Patent Application No. 2020-072241 filed on Apr. 14, 2020, the entire contents of which are hereby incorporated by reference.

BACKGROUND

The disclosure relates to vehicle travel control devices, and particularly, to travel control to be performed during a lane change at a lane merging section.

In recent years, various kinds of travel control devices for vehicles, such as automobiles, have been proposed. A travel control device acquires information related to conditions surrounding a vehicle (e.g., information related to an environment surrounding the vehicle, including another vehicle traveling in the vicinity of the vehicle, a bicycle, a pedestrian, and an obstacle) by using a sensor device, such as a vehicle-mounted camera unit or a radar device, and performs travel control of the vehicle based on the acquired information data and road map information obtained from, for example, a high-resolution road map database.

With regard to such a vehicle travel control device, there have been various examples of travel control to be performed during a lane change, such as an example proposed in Japanese Unexamined Patent Application Publication (JP-A) 2019-51837.

On a normal road, a branch lane (i.e., so-called merging lane) is given a sufficient length (i.e., distance including a parallel segment of the merging lane extending parallel to the main road) so that, when a vehicle traveling on the merging lane is to merge into the main road, the merging can be performed safely and smoothly. A sufficient length of the merging lane for performing the merging safely and smoothly refers to, for example, a sufficient distance within which the vehicle on the merging lane can accelerate sufficiently while a sufficient determination time can be ensured for setting an appropriate merging timing in view of another vehicle traveling on the main road.

When the merging lane is given a sufficient length in this manner, the merging lane has a long parallel segment that extends parallel to the main road. Therefore, the travel control to be applied in this case may be similar to the travel control to be executed during a lane change on a normal road, as disclosed in JP-A 2019-51837.

However, it may sometimes be difficult to ensure a sufficient length for the merging lane depending on various factors, such as the environment surrounding the road. Therefore, there may somewhat be a situation where a sufficient distance is not necessarily set with regard to the length of the merging lane in actual road conditions.

Moreover, even in a case where a sufficiently long merging lane is set in view of the road design, there may be a conceivable case where an appropriate merging timing is missed when traveling on the merging lane or an obstacle (e.g., another vehicle, such as a construction vehicle, a construction pole, a damaged road section, or a dropped object) exists on the merging lane. In such a case, the usable distance of the merging lane may be reduced.

SUMMARY

An aspect of the disclosure provides a vehicle travel control device including a travel information collector and a travel control unit. The travel information collector is configured to collect travel environment information of a first vehicle. The travel environment information at least includes travel information of the first vehicle, ambient environment information of the first vehicle including external appearance information of a second vehicle, and first-vehicle lane information used for recognizing a traveling lane of the first vehicle. The travel control unit is configured to perform travel control of the first vehicle on a basis of the travel environment information collected by the travel information collector. When the traveling lane of the first vehicle is a nonpriority lane and the first vehicle is to merge from the nonpriority lane into a priority lane, the travel control unit is configured to perform control for causing the first vehicle to travel along a lane boundary line of the traveling lane, on a basis of the travel environment information collected by the travel information collector.

An aspect of the disclosure provides a vehicle travel control device including circuitry. The circuitry is configured to collect travel environment information of a first vehicle. The travel environment information at least includes travel information the first vehicle, ambient environment information of the first vehicle including external appearance information of a second vehicle, and first-vehicle lane information used for recognizing a traveling lane of the first vehicle. The circuitry is configured to perform travel control of the first vehicle on a basis of the collected travel environment information. When the traveling lane of the first vehicle is a nonpriority lane and the first vehicle is to merge from the nonpriority lane into a priority lane, the circuitry is configured to perform control for causing the subject vehicle to travel along a lane boundary line of the traveling lane, on a basis of the collected travel environment information.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 2 schematically illustrates an example of a situation where a vehicle equipped with the travel control device according to the embodiment of the disclosure and traveling on a merging lane merges into the main road by changing lanes (in a case where the merging lane is long);

FIG. 3 schematically illustrates another example of a situation where a vehicle equipped with the travel control device according to the embodiment of the disclosure and traveling on a merging lane merges into the main road by changing lanes (in a case where the merging lane is long);

DETAILED DESCRIPTION

Figure 1:
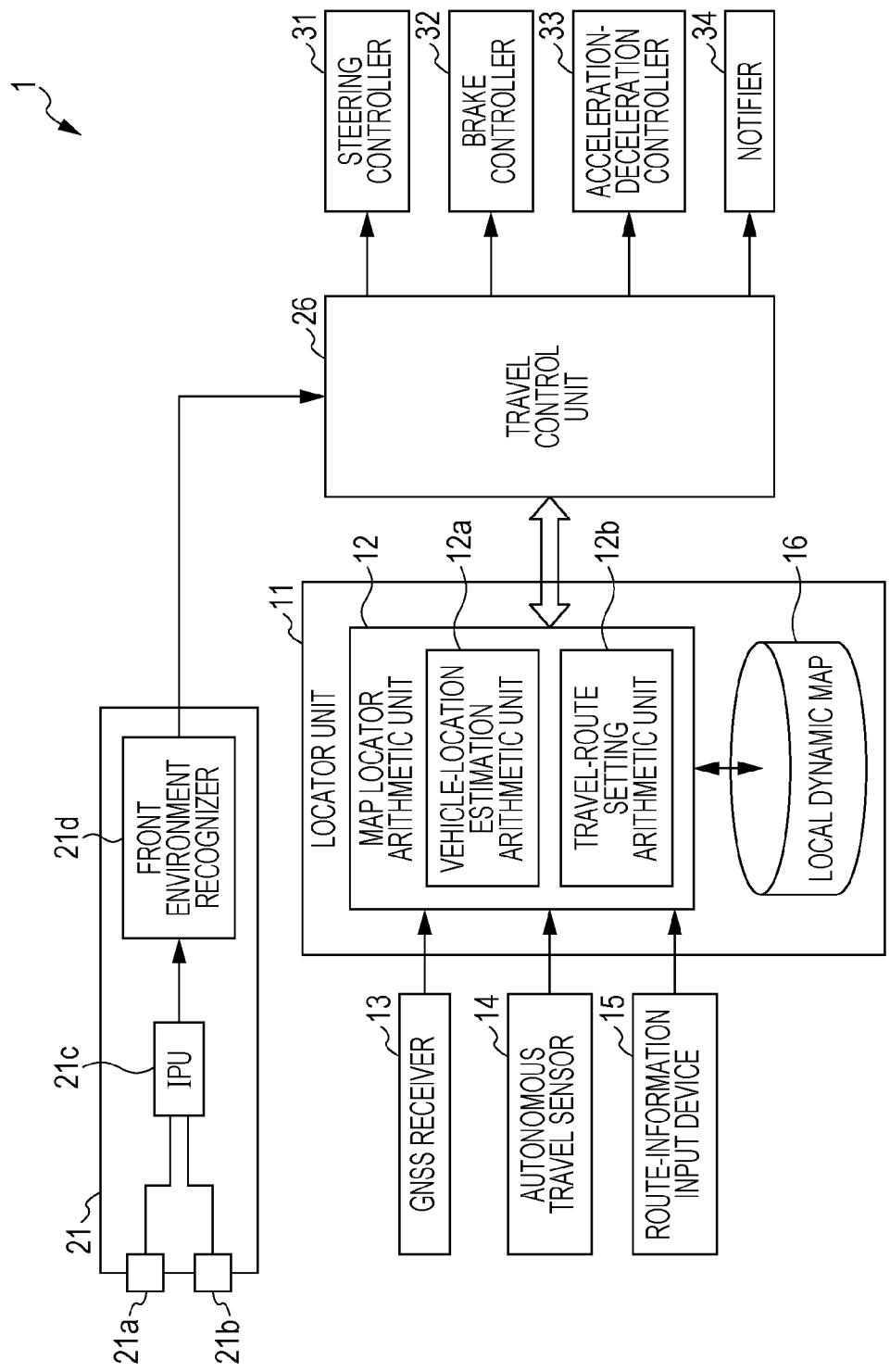
FIG. 1 is a block diagram schematically illustrating the configuration of a travel control device according to an embodiment of the disclosure.

In the vehicle travel control device in the related art disclosed in JP-A 2019-51837, the length and shape of a merging lane as well as the road conditions are not taken into consideration. For example, in a condition where the merging lane is short, it may be problematic in that safe and smooth travel control may possibly be difficult during a lane change at a lane merging section.

It is desirable to provide a vehicle travel control device that can constantly perform travel control safely and smoothly without bringing discomfort during a lane change at a lane merging section.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle travel control device according to an embodiment of the disclosure is installed in a vehicle, such as an automobile, and assists a driver in a driving operation by performing travel control of the vehicle. For example, the travel control device according to this embodiment acquires information related to conditions surrounding the vehicle (e.g., ambient environment information, that is, information related to an environment surrounding the vehicle, including another vehicle (i.e., various kinds of information including external appearance information) traveling in the vicinity of the vehicle, a bicycle, a pedestrian, and an obstacle) by using a sensor device, such as a vehicle-mounted camera unit or a radar device, recognizes road conditions, including a vehicle ahead and various kinds of obstacles, based on the acquired information data and road map information obtained from, for example, a high-resolution road map database, and uses the recognized information as information when the travel control device is to execute travel control for assisting the driver in a driving operation. The travel control device according to this embodiment is characterized in that it performs travel control during a lane change at a lane merging section.

First, the schematic configuration of the travel control device according to the embodiment of the disclosure will be described below with reference to a block diagram in FIG. 1.

The basic configuration of a travel control device 1 according to this embodiment is substantially similar to that of a travel control device in the related art. Therefore, with regard to the configuration of the travel control device 1 according to this embodiment, the main configuration of the device will simply be described, whereas a detailed configuration thereof will be omitted assuming that it is similar to that of the travel control device in the related art. Furthermore, FIG. 1 simply illustrates the main configuration of the travel control device according to this embodiment and does not illustrate the detailed configuration thereof.

The travel control device 1 according to this embodiment performs travel control for automated driving and is installed in the vehicle. The travel control device 1 includes a locator unit 11 that detects the vehicle location, a camera unit 21 serving as a travel-environment acquiring unit and as a part of a travel information collector that recognizes, acquires, and collects travel environment as information in the traveling (forward) direction of the vehicle, and a travel control unit that performs travel control of the vehicle based on the travel-environment-related information (referred to as "travel environment information") collected by the travel information collector including the camera unit 21.

The locator unit 11 is a travel information collector that estimates the location of the vehicle (i.e., vehicle location) on a road map and acquires road map information forward of the vehicle location.

The camera unit 21 determines the road curvature of the center of left and right boundary lines (i.e., lane boundary lines) for the traveling lane of the vehicle, and detects a transverse deviation in the vehicle width direction with reference to the center of the left and right boundary lines.

The camera unit 21 also recognizes ambient road conditions (such as a building adjacent to the road, a fence, a soundproof wall, and a guard rail), in addition to a leading vehicle traveling ahead of the vehicle, a three-dimensional object including a moving object, such as a pedestrian, a bicycle, or a motorcycle, crossing immediately ahead of the vehicle, and road indications, such as a signal indication (e.g., a lit signal, a blinking signal, or an arrow signal), a road sign, a stop line, and a lane boundary line.

The locator unit 11 has a map locator arithmetic unit 12 and a high-resolution road map database 16 as a storage unit.

The map locator arithmetic unit 12, a front environment recognizer 21d to be described later, and the travel control unit 26 are each constituted of, for example, a known microcomputer including a central processing unit (CPU), a random access memory (RAM), a read only memory (ROM), and a nonvolatile storage unit, and peripheral devices thereof. A program to be executed by the CPU and fixed data, such as a data table, are preliminarily stored in the ROM.

The input side of the map locator arithmetic unit 12 is coupled to a global navigation satellite system (GNSS) receiver 13 as a vehicle-location acquiring unit, an autonomous travel sensor 14 as a driving-mode acquiring unit, and a route-information input device 15.

The GNSS receiver 13 receives positioning signals transmitted from a plurality of navigation satellites. The autonomous travel sensor 14 allows for autonomous travel in an environment, such as inside a tunnel, where it is difficult to receive an effective positioning signal from the GNSS receiver 13 due to low reception sensitivity therefrom, and is constituted of, for example, a vehicle speed sensor, a yaw rate sensor, and a front-rear acceleration sensor.

The map locator arithmetic unit 12 performs localization from the moving distance and bearing based on a vehicle speed detected by the vehicle speed sensor, a yaw rate (i.e., yaw angular velocity) detected by the yaw rate sensor, and front-rear acceleration detected by the front-rear acceleration sensor.

The route-information input device 15 is a terminal device to be operated by, for example, the driver or a passenger. The route-information input device 15 can be used for inputting a group of information to be used when setting a travel route in the map locator arithmetic unit 12, such as when setting a destination or a stopping point (such as a service area of a highway road).

In detail, the route-information input device 15 is any one of an input unit (e.g., a touchscreen of a monitor) of a car navigation system, a portable terminal, such as a smartphone, and a personal computer, and is coupled to the map locator arithmetic unit 12 in a wired or wireless manner.

When the driver or the passenger operates the route-information input device 15 to input information about the destination and the stopping point (such as a facility name, address, and telephone number), the input information is read by the map locator arithmetic unit 12.

When the destination and the stopping point are input, the map locator arithmetic unit 12 sets the positional coordinates (i.e., latitude and longitude) thereof. The map locator arithmetic unit 12 includes a vehicle-location estimation arithmetic unit 12*a* as a vehicle location estimator that estimates the vehicle location, and also includes a travel-route setting arithmetic unit 12*b* that sets a travel route from the vehicle location to the destination (and the stopping point).

The map locator arithmetic unit 12 also identifies the current location of the vehicle by map-matching the vehicle location estimated by the vehicle-location estimation arithmetic unit 12*a* on the road map, acquiring road map information including peripheral environment information, and setting a target travel path for the vehicle.

The high-resolution road map database 16 is a mass storage medium, such as either one of a hard disk drive (HDD) and a solid state drive (SSD), and stores known high-resolution road map information (i.e., local dynamic map). This high-resolution road map information has a hierarchical structure in which additional map information to be used for supporting automated travel is superposed on a lowermost static information layer serving as a foundation. The additional map information includes static positional information, such as a road type (e.g., a general road or a highway road), a road shape, left and right boundary lines (i.e., lane boundary lines), an exit of a highway road or a bypass road, and an entrance-exit length (i.e., start position and end position) of a branch lane or a merging lane leading to a junction or a service area, as well as dynamic positional information, such as traffic information and traffic regulation caused by an accident or construction.

The vehicle-location estimation arithmetic unit 12*a* acquires the current positional coordinates (i.e., latitude and longitude) of the vehicle based on the positioning signal received by the GNSS receiver 13 and estimates the vehicle location (i.e., current location) on the road map by map-matching the positional coordinates on the map information. Moreover, the vehicle-location estimation arithmetic unit 12*a* identifies the traveling lane of the vehicle, acquires the road shapes of, for example, the traveling lane and the merging lane stored in the map information, and successively stores the road shapes.

Furthermore, in an environment, such as inside a tunnel, where it is difficult to receive an effective positioning signal from the GNSS receiver 13 due to low reception sensitivity therefrom, the vehicle-location estimation arithmetic unit 12*a* switches to an autonomous navigation mode and performs localization in accordance with the autonomous travel sensor 14.

The travel-route setting arithmetic unit 12*b* refers to the local dynamic map stored in the high-resolution road map database 16 based on the positional information (i.e., latitude and longitude) of the vehicle location estimated by the vehicle-location estimation arithmetic unit 12*a* and the positional information (i.e., latitude and longitude) of the input destination (and the stopping point). Then, the travel-route setting arithmetic unit 12*b* establishes a travel route between the vehicle location and the destination (i.e., the destination via a stopping point if the stopping point is set) on the local dynamic map in accordance with a preset route condition (i.e., recommended route, fastest route, and so on).

The camera unit 21 is fixed to an upper central area at the front of the vehicle cabin of the vehicle and has a vehicle-mounted camera (i.e., stereo camera) constituted of a main camera 21*a* and a sub camera 21*b* that are disposed at bilaterally-symmetric locations with respect to the center in the vehicle width direction, an image processing unit (IPU) 21*c*, and the front environment recognizer 21*d*. The camera unit 21 uses the main camera 21*a* to acquire reference image data, and uses the sub camera 21*b* to acquire comparison image data.

The two pieces of image data acquired by the two cameras 21*a* and 21*b* undergo image processing at the IPU 21*c*. The front environment recognizer 21*d* reads the reference image data and the comparison image data processed by the IPU 21*c* so as to recognize the same object in the two images based on parallax between the two images, and also calculates distance data (i.e., distance from the vehicle to the object) by using the triangulation principle so as to recognize front environment information. The front environment information includes a road shape (e.g., the left and right boundary lines indicating a lane, the road curvature [1/m] at the center between the boundary lines, and the width (lane width) between the left and right boundary lines) of a travel path (i.e., a merging lane or a traveling lane) on which the vehicle travels, an entrance or an exit of, for example, a highway road or a bypass road, a lane width between boundary lines of a merging lane or a branch lane leading to a junction, an intersection, a pedestrian crossing, a traffic light, a road sign, and a roadside obstacle (such as a power pole, a telephone pole, or a parked vehicle).

In addition to the camera unit 21, the travel control device 1 according to this embodiment may include, for example, a radar device as an autonomous sensor serving as a detector that detects travel path information. In detail, this radar device has an autonomous sensor as a detector that uses various kinds of radars, such as a millimeter-wave radar, a laser radar, or a LIDER (light detection and ranging).

The travel control unit 26 has its input side coupled to the front environment recognizer 21*d* of the camera unit 21 and is also coupled to the map locator arithmetic unit 12 in a bidirectional communicable manner via an in-vehicle communication line (e.g., controller area network (CAN) (not illustrated)). In a case where a radar device is provided, the radar device is also coupled to the travel control unit 26.

The output side of the travel control unit 26 is coupled to a steering controller 31 that causes the vehicle to travel along a travel route, a brake controller 32 that decelerates the vehicle by forcibly applying a braking force thereto, an acceleration-deceleration controller 33 that controls the vehicle speed of the vehicle, and a notifier 34, such as a monitor and a loudspeaker.

If the travel route set by the travel-route setting arithmetic unit 12*b* has an automated driving segment where automated drive control is permitted, the travel control unit 26 sets a target travel path for performing automated driving in the automated driving segment. Then, in the automated driving segment, the steering controller 31, the brake controller 32, and the acceleration-deceleration controller 33 undergo predetermined control, so that the vehicle travels automatically along the target travel path based on the positioning signal indicating the vehicle location received by the GNSS receiver 13.

In this case, if a vehicle ahead is detected in accordance with known adaptive cruise control (ACC) and active lane keep (ALK) control based on the front environment information recognized by the front environment recognizer 21d, the travel control unit 26 causes the vehicle to follow the vehicle ahead. If a vehicle ahead is not detected, the travel control unit 26 causes the vehicle to travel at a set vehicle speed within the speed limit.

Furthermore, if the travel control unit 26 detects a moving object crossing immediately ahead of the vehicle or recognizes a prescribed road sign instructing the driver to make a stop or a prescribed road indication, such as a stop line, based on the front environment information recognized by the front environment recognizer 21d, the travel control unit actuates the brake controller 32, as appropriate, in accordance with the recognized information to perform control for stopping the vehicle at a prescribed position.

The notifier 34 notifies the driver of a warning (e.g., outputs a warning sound or displays a warning on the instrument panel) according to a recognized condition based on the front environment information recognized by the front environment recognizer 21d and obtained by the travel control unit 26.

According to circumstances, the notifier 34 may perform various kinds of display by aurally or visually suggesting the driver to perform an operation (e.g., press the brake pedal or correct the steering angle).

As mentioned above, the travel control unit 26 performs various kinds of determination for controlling, for example, the steering controller 31, the brake controller 32, the acceleration-deceleration controller 33, and the notifier 34 based on output information from the front environment recognizer 21d and the GNSS receiver 13. The configuration of the travel control device 1 according to this embodiment has substantially been described above.

The operation of the travel control device 1 according to this embodiment having the above-described configuration will now be described.

In this embodiment, the vehicle travel control to be performed by the travel control device 1 particularly relates to lane-change travel control at a lane merging section. In detail, the vehicle travel control relates to travel control to be performed when a vehicle traveling on a branch lane (i.e., referred to as "merging lane" hereinafter) as a nonpriority lane merges into the main road as a priority lane.

For example, in a case where the vehicle traveling on a merging lane is to perform a lane change for merging into the main road when the vehicle is traveling on a target travel path appropriately set for performing automated driving, the target vehicle speed when the lane change is to be executed and the timing for performing the lane change are set first. In this case, the target vehicle speed and the lane changing timing vary depending on the distance of a parallel segment of the merging lane extending parallel to the main road.

Figure 4:
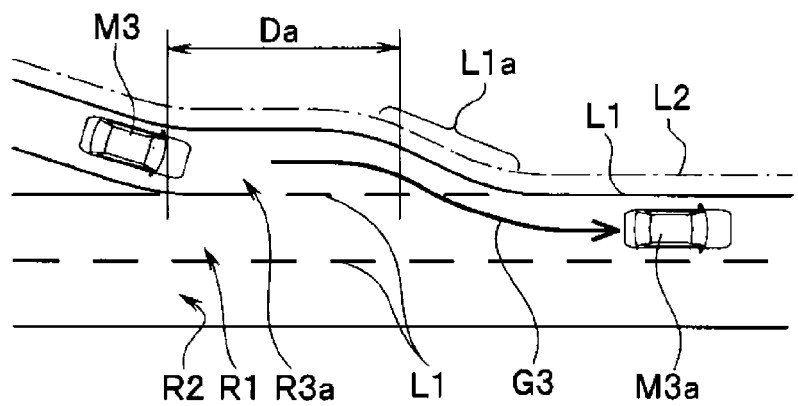
FIG. 4 schematically illustrates an example of a situation where a vehicle equipped with the travel control device according to the embodiment of the disclosure and traveling on a merging lane merges into the main road by changing lanes (in a case where the merging lane is short)

FIG. 2 to FIG. 4 schematically illustrate how a vehicle traveling on a merging lane merges into the main road by changing lanes. FIG. 2 and FIG. 3 each illustrate an example where the parallel segment of the merging lane extending parallel to the main road has a sufficient length. FIG. 2 illustrates an example of a travel path of the vehicle when normal lane-change control is to be performed. FIG. 3 illustrates an example of a travel path of the vehicle when lane-change control is to be performed in a situation where the remaining distance for the parallel segment of the merging lane is small due to the effect of surrounding conditions. FIG. 4 illustrates an example where the distance set for the parallel segment of the merging lane extending parallel to the main road is small.

The examples in FIG. 2 to FIG. 4 illustrate road conditions where merging lanes R3 and R3a extend parallel to and merge with a first lane R1 of the main road having two lanes (i.e., a first lane R1 and a second lane R2) on each side. With regard to the merging lane R3 in FIG. 2 and FIG. 3, the parallel segment thereof extending parallel to the main road has a large distance. With regard to the merging lane R3a in FIG. 4, the parallel segment thereof extending parallel to the main road has a small distance.

A reference sign D in each of FIG. 2 and FIG. 3 indicates the length (i.e., distance) of the parallel segment of the merging lane R3. A reference sign Da in FIG. 4 indicates the length (i.e., distance) of the parallel segment of the merging lane R3a. A reference sign Dx in FIG. 3 indicates the remaining distance (i.e., distance from a vehicle M2 to the end of the merging lane R3) of the parallel segment of the merging lane R3, as viewed ahead from the vehicle M2 traveling on the merging lane R3. Reference signs L1 and L1a in FIG. 2 to FIG. 4 each indicate a lane boundary line. In one example, the lane boundary line indicated by the reference sign L1a indicates the lane boundary line at the end point of the merging lane R3. In detail, the lane boundary line L1a at the end point of the merging lane R3 indicates the lane boundary line at the roadside. In details, of the opposite side surfaces of the running vehicle in the vehicle width direction, the surface opposite from the surface facing the main road faces this roadside. The lane boundary line L1a extends obliquely relative to the other lane boundary lines L1.

A reference sign L2 in each of FIG. 2 to FIG. 4 indicates a boundary line of a structural object (e.g., soundproof wall or a guard rail) provided in a region outside the lane boundary line L1 of the merging lane R3. Of the opposite side surfaces of the running vehicle in the vehicle width direction, the surface opposite from the surface facing the main road faces this region outside the lane boundary line L1 of the merging lane R3. Furthermore, reference signs M1 and M1a in FIG. 2, reference signs M2 and M2a in FIG. 3, and reference signs M3 and M3a in FIG. 4 each denote the vehicle and indicate the location of the vehicle at a corresponding predetermined time point. This will be described in detail later. Moreover, a reference sign Mc in FIG. 2 indicates another vehicle traveling on the main road. A reference sign G1 in FIG. 2, a reference sign G2 in FIG. 3, and a reference sign G3 in FIG. 4 each denote a target travel path in a corresponding situation.

The merging lane R3 illustrated in each of FIG. 2 and FIG. 3 is an example of a case where the parallel segment of the merging lane R3 is given a sufficient distance for allowing a vehicle traveling on the parallel segment to have enough time to change lanes for merging into the main road. The distance D of the parallel segment of the merging lane R3 set in this manner is assumed to be, for example, about 200 m. Therefore, in this embodiment, the numerical value of this distance of 200 m is set as a first threshold value Dth1 (see FIG. 5 to be described later).

Normally, when a vehicle traveling on a merging lane is to perform a lane change to merge into the main road, it is desirable that the lane change be performed in a state where the vehicle is accelerated sufficiently on the merging lane to a vehicle speed equal to that of a vehicle traveling on the main road. In view of this, for example, in order to have enough time for performing the lane change, it is desirable that about 10 seconds be used. The aforementioned first threshold value Dth1 is set in view of the distance by which a vehicle travels in about 10 seconds. In detail, for example, a vehicle traveling at a speed of 80 km/h advances about 200 m in about 9 seconds. Moreover, a vehicle traveling at a speed of 100 km/h advances about 200 m in about 7 seconds.

Thus, in the following description of this embodiment, the first threshold value Dth1 is set to 200 m. A first target vehicle speed V1 when a lane change is to be performed under such a condition is set between 80 km/h and 100 km/h.

In FIG. 2, the vehicle M1 entering the merging lane R3 accelerates sufficiently within the parallel segment of the merging lane R3 having the sufficiently large distance D. When the vehicle M1 reaches the predetermined first target vehicle speed V1, travel control for merging into the first lane R1 of the main road is performed in accordance with a predetermined lane-change control process. In this case, the vehicle M1 traveling on the parallel segment of the merging lane R3 performs acceleration-deceleration control for achieving the first target vehicle speed V1, while confirming the surrounding conditions. Then, the vehicle M1 performs predetermined lane-change control based on various kinds of information including a confirmatory result of the surrounding conditions (e.g., existence or nonexistence of another vehicle) and the vehicle conditions of the vehicle M1 (e.g., whether the first target vehicle speed V1 is reached). A target travel path in this case is indicated by the reference sign G1.

The situation illustrated in FIG. 3 relates to a case where the vehicle M2 traveling on the merging lane R3 continues to travel thereon without being able to transition to normal lane-change control due to a confirmatory result of the surrounding conditions (e.g., effect of the existence of another vehicle Mc traveling on the main road), such that the remaining distance Dx to the end of the merging lane R3 has become smaller than a second predetermined distance (e.g., 30 m) (see FIG. 3).

In order to safely perform a lane change in such a situation, it is desirable that the remaining distance Dx to the end of the merging lane R3 be, for example, about 30 m. Therefore, in this embodiment, the numerical value of this distance of 30 m is set as a second threshold value Dth2 (see FIG. 5 to be described later).

Normally, the distance to be used from the start to the end of a lane change is conceived to be about 30 m. For example, a vehicle traveling at a speed of 40 km/h advances about 30 m in about 3 seconds. Thus, in the following description of this embodiment, the second threshold value Dth2 is set to 30 m. A second target vehicle speed V2 when a lane change is to be performed under such a condition is set to 40 km/h.

On the other hand, as illustrated in FIG. 4, the parallel segment of the merging lane R3a is sometimes given a small distance. The distance Da of the parallel segment of the merging lane R3 set in this manner is assumed to be, for example, about 30 m. Therefore, in this case, the numerical value of this distance of 30 m is set as the second threshold value Dth2 (see FIG. 5 to be described later).

Figure 5:
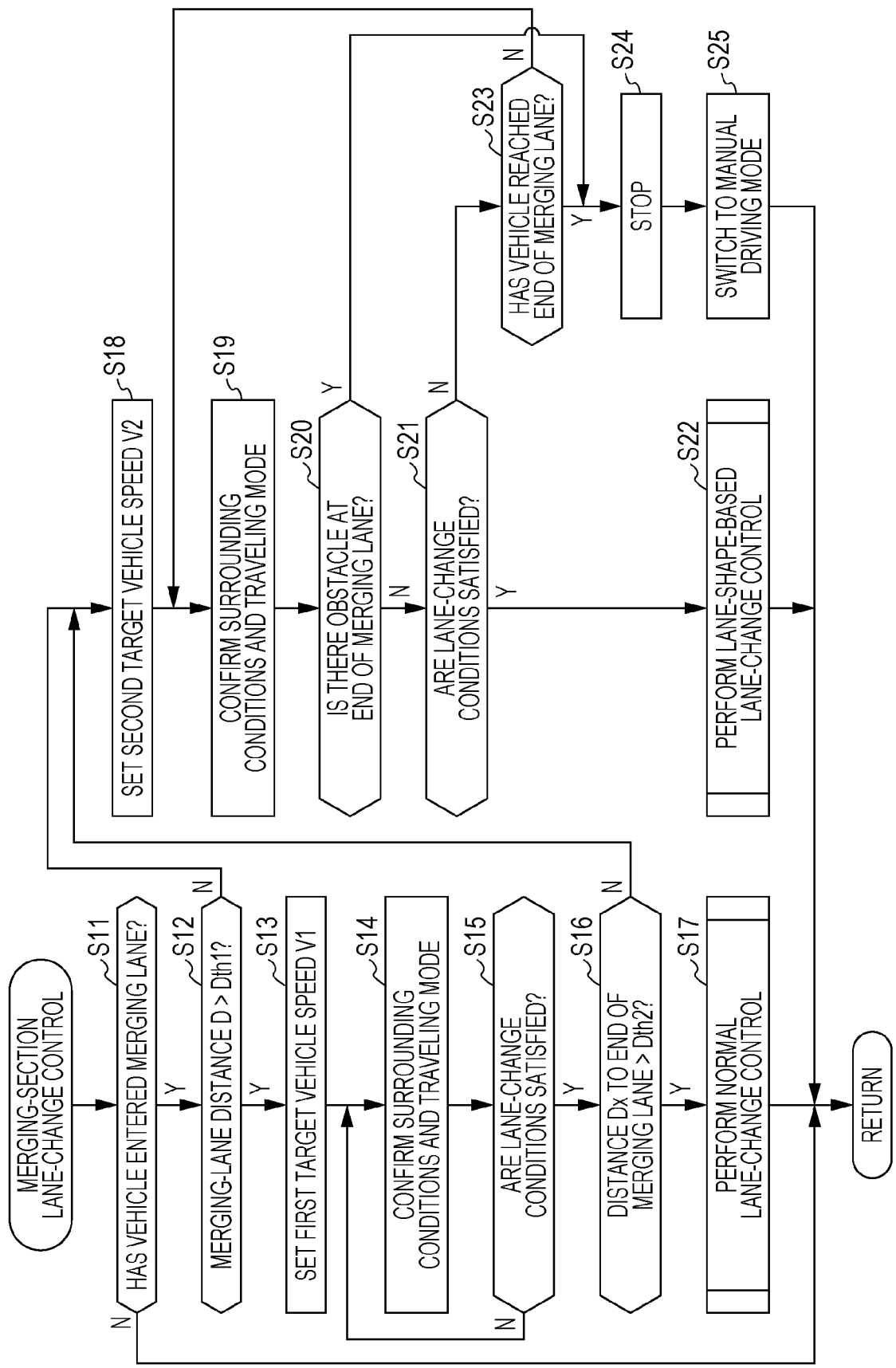
FIG. 5 is a flowchart illustrating the flow of a lane-change control process in the travel control device according to the embodiment of the disclosure.

The following description with reference to a flowchart in FIG. 5 relates to travel control to be performed when a vehicle traveling on a merging lane (i.e., nonpriority lane) performs a lane change for merging into the main road (i.e. priority lane) in such situations.

In the following description, a vehicle equipped with the travel control device 1 according to this embodiment and merging into the main road from a merging lane by performing a lane change may be referred to as "subject vehicle".

FIG. 5 is a flowchart illustrating the flow of a merging-section lane-change control process to be executed by the travel control device 1 according to this embodiment.

First, it is assumed that the subject vehicle equipped with the travel control device 1 according to this embodiment is traveling on a road while executing a normal travel control process (not illustrated). In this case, the travel control device 1 causes the subject vehicle to travel by performing travel control of the subject vehicle, while acquiring travel environment information and road map information from the travel information collector (such as the camera unit 21 and the locator unit 11).

In this case, the travel control unit 26 of the travel control device 1 occasionally recognizes the traveling condition of the subject vehicle based on the travel environment information and the road map information that are continuously received.

For example, when the travel control unit 26 recognizes that the subject vehicle has entered a merging lane as a nonpriority lane merging with a priority lane, the travel control unit 26 starts to execute the merging-section lane-change control process in FIG. 5. In step S11 in FIG. 5, the travel control unit 26 confirms whether the subject vehicle has entered the merging lane. If it is confirmed that the subject vehicle has entered the merging lane, the travel control unit 26 proceeds to step S12. If it is not confirmed that the subject vehicle has entered the merging lane, the travel control unit 26 exits the current control process and returns to the original process (return).

In step S12 in FIG. 5, the travel control unit 26 confirms whether the distance D of the merging lane R3 is larger than the predetermined first threshold value Dth1 (D>Dth1) based on the travel environment information and the road map information input from the front environment recognizer 21d and the locator unit 11 (i.e., travel information collector).

In other words, it is determined whether the distance D of the merging lane R3 that the subject vehicle has entered is larger than a predetermined distance (e.g., 200 m). If it is confirmed that the distance D of the merging lane R3 is larger than the first threshold value Dth1 (i.e., if the distance D of the merging lane R3 is larger than, for example, 200 m), the travel control unit 26 proceeds to step S13. If it is confirmed that the distance D of the merging lane R3 is not larger than the first threshold value Dth1 (i.e., if the distance D of the merging lane R3 is smaller than, for example, 200 m), the travel control unit 26 proceeds to step S18.

In step S13, the travel control unit 26 sets the first target vehicle speed V1 (e.g., 80 km/h to 100 km/h).

In step S14, the travel control unit 26 confirms the conditions surrounding the subject vehicle (e.g., another vehicle ahead traveling on the merging lane, another vehicle traveling on the main road, lane boundary lines, and an obstacle) and the traveling mode of the subject vehicle (e.g., whether there is a temporal change in the vehicle speed or whether the target vehicle speed is reached) based on the input travel environment information and the input road map information.

In step S15, the travel control unit 26 determines whether the subject vehicle is capable of performing a lane change, that is, whether lane-change conditions are satisfied, based on the various kinds of information confirmed in step S14 described above. The lane-change conditions refer to various kinds of conditions, including a condition where there is no other vehicle in the surroundings, a condition where there is no obstacle, and a condition where the first target vehicle speed V1 is reached.

If it is determined in step S15 that the lane-change conditions are satisfied, the travel control unit 26 proceeds to step S16. If the lane-change conditions are not satisfied, the travel control unit 26 returns to step S14 described above and repeats the steps thereafter.

When it is determined that the lane-change conditions are satisfied and the travel control unit 26 proceeds to step S16, the travel control unit 26 confirms in step S16 whether the distance Dx to the end of the merging lane R3 on which the subject vehicle is traveling is larger than the second threshold value Dth2 (Dx>Dth2) based on the input travel environment information and the input road map information. If the distance Dx to the end is not larger (i.e., is smaller) than the second threshold value Dth2 (i.e., if Dx>Dth2 is not satisfied), this implies that the distance Dx is smaller than, for example, 30 m. Thus, the travel control unit 26 proceeds to step S18.

If the distance Dx to the end is larger than the second threshold value Dth2 (i.e., if Dx>Dth2 is satisfied), this implies that the distance Dx to the end ranges between, for example, 30 m and 200 m. Thus, the travel control unit 26 proceeds to step S17. In step S17, the travel control unit 26 executes the normal lane-change control process.

With regard to the normal lane-change control process to be executed in step S17, a known processing sequence normally used in the related art is applied. For example, the travel control device 1 of the subject vehicle generates a first target travel path on the merging lane R3 on which the subject vehicle is traveling, and also generates a second target travel path on the first lane R1 of the main road on which the subject vehicle is to travel after the lane change.

In this case, the travel control device 1 first identifies the vehicle location and the lane boundary lines of the merging lane R3 and the first lane R1.

Then, the identified vehicle location and the identified lane boundary lines are used to calculate a moving distance of the subject vehicle in the width direction of each lane (i.e., distance (target moving distance for each lane) from the center of the moving vehicle to the lane boundary) when the subject vehicle is to move along the corresponding target travel path.

Then, the first target travel path and the second target travel path are generated by using the calculated target moving distances and the rates of change (jerk) in the acceleration of the subject vehicle in the lane width direction on the respective target travel paths.

Furthermore, the first target travel path and the second target travel path are corrected, as appropriate, in accordance with the environment surrounding the subject vehicle.

Based on the pieces of information about the first target travel path and the second target travel path generated in this manner, a command value (e.g., a target steering-angle value) to be used in the lane-change control is generated, and the lane-change control is executed by performing steering control based on the generated command value.

When the lane change based on the normal lane-change control process (step S17) is completed in this manner, the travel control unit 26 returns to the original process (return).

On the other hand, if it is confirmed in step S12 described above that the distance D of the merging lane R3 is not larger than the first threshold value Dth1 (i.e., if the distance D of the merging lane R3 is smaller than, for example, 200 m) and if it is confirmed in step S16 described above that the distance Dx to the end of the merging lane R3 is not larger than the second threshold value Dth2 (i.e., if the distance Dx to the end of the merging lane R3 is smaller than, for example, m), the travel control unit 26 proceeds to step S18, as mentioned above.

In this case, in step S18, the travel control unit 26 sets the second target vehicle speed V2 (e.g., 40 km/h).

Then, in step S19, the travel control unit 26 confirms the conditions surrounding the subject vehicle (e.g., a lane boundary line and an obstacle) and the traveling mode of the subject vehicle (e.g., whether there is a temporal change in the vehicle speed or whether the target vehicle speed is reached) based on the input travel environment information and the input road map information.

The confirmation process performed in step S19 is substantially similar to the confirmation process performed in step S14 described above. However, step S19 is performed when the merging-lane distance D is equal to the distance Da that is smaller than the predetermined distance (e.g., when the first predetermined distance is smaller than 30 m, that is, the situation in FIG. 4) or when the distance D of the merging lane R3 on which the subject vehicle is traveling is large but the distance Dx to the end of the merging lane R3 is smaller than the predetermined distance (e.g., smaller than 30 m, that is, the situation in FIG. 3). A small distance may lead to an insufficient time. Therefore, the confirmation process performed in step S19 is a simplified process with limited checking items, as compared with the confirmation process performed in step S14 described above.

Subsequently, in step S20, the travel control unit 26 confirms whether there is an obstacle at the end of the merging lane R3 based on the travel environment information and the road map information acquired in step S19 described above. If an obstacle is confirmed at the end of the merging lane R3, the travel control unit 26 proceeds to step S24.

In step S24, the travel control unit 26 performs braking control for stopping the subject vehicle via the brake controller 32. When the subject vehicle is stopped, the travel control unit 26 switches the driving mode to a manual driving mode in step S25. Subsequently, the travel control unit 26 returns to the original process (return).

If an obstacle is not confirmed at the end of the merging lane R3 in step S20 described above, the travel control unit 26 proceeds to step S21.

Then, in step S21, the travel control unit 26 determines whether the subject vehicle is capable of performing a lane change, that is, whether the lane-change conditions are satisfied, based on the various kinds of information confirmed in step S19 described above. If it is determined that the lane-change conditions are satisfied, the travel control unit 26 proceeds to step S22.

In step S22, the travel control unit 26 executes a lane-shape-based lane-change control process.

A lane-shape-based lane-change control process involves the following processing sequence. First, based on travel environment information and road map information input from the front environment recognizer 21d and the locator unit 11 (i.e., travel information collector), the travel control unit 26 of the travel control device 1 of the subject vehicle generates a first target travel path on the merging lane R3 on which the subject vehicle is traveling, and also generates a second target travel path on the first lane R1 of the main road on which the subject vehicle is to travel after a lane change. In this case, the travel control unit 26 of the travel control device 1 identifies the vehicle location and the lane boundary lines of the merging lane R3 and the first lane R1.

The lane boundary line L1 of the merging lane R3 extends at the end point thereof such that the lane boundary line Lia (see FIG. 2 to FIG. 4) at the roadside approaches gradually toward the main road. Of the opposite side surfaces of the running vehicle in the vehicle width direction, the surface opposite from the surface facing the main road faces this roadside. Therefore, lane-boundary-line information to be used in the lane-shape-based lane-change control process to be executed in step S22 in FIG. 5 mainly includes information about the shape of the lane boundary line L1a, and the lane boundary lines L1 of the first lane R1 of the main road.

Then, a first target travel path near the end point of the merging lane R3 is set by using the identified vehicle location and the identified lane boundary lines L1 and L1a. The first target travel path near the end point of the merging lane R3 is a line substantially equivalent to a travel path obtained by parallel-shifting a curve extending along the lane boundary line L1a toward the center of the merging lane R3. In this case, the parallel-shifting amount is at least half the width of the subject vehicle, and is, for example, about half the lane width of the parallel segment of the merging lane R3 extending parallel to the main road. Therefore, when the subject vehicle travels along the first target travel path, the side surfaces of the subject vehicle are parallel to the lane boundary line L1a.

The second target travel path on the first lane R1 of the main road on which the subject vehicle is to travel after the lane change is set to resemble a line extending along a circular arc that inscribes both an extension of the first target travel path set as above and a straight line extending through the center of the first lane R1 of the main road in the width direction.

Based on the pieces of information about the first target travel path and the second target travel path generated in this manner, a command value (e.g., a target steering-angle value) to be used in the lane-change control is generated, and the lane-change control is executed by performing steering control based on the generated command value. In that case, control is performed such that the subject vehicle is first made to travel to the vicinity of the end point of the merging lane R3, and is subsequently made to travel along the first target travel path and the second target travel path at a predetermined timing.

If travel control along the first target travel path and the second target travel path set as described above is to be performed near the end point of the merging lane R3, the vehicle speed is further controlled, as appropriate, in accordance with the environment surrounding the subject vehicle.

For example, when travel control along the set first target travel path and the set second target travel path is to be performed at the end point of the merging lane R3, the travel control unit 26 confirms the surrounding conditions of the subject vehicle in the traveling direction based on travel environment information and road map information that are continuously input. In this case, it may be predicted that another vehicle traveling on the main road may interfere with the subject vehicle at a predicted time point at which the subject vehicle is to travel on the second target travel path. In such a case, the travel control unit 26 performs deceleration control by controlling either one of the brake controller 32 and the acceleration-deceleration controller 33 before the predicted time point at which the subject vehicle is to pass through the second target travel path is reached. Accordingly, when the subject vehicle changes from the merging lane R3 to the first lane R1 of the main road, interference with another vehicle traveling on the main road can be avoided.

When the lane change according to the lane-shape-based lane-change control process (step S22) is completed in this manner, the travel control unit 26 returns to the original process (return).

On the other hand, if it is determined in step S21 described above that the lane-change conditions are not satisfied, the travel control unit 26 proceeds to step S23.

In step S23, the travel control unit 26 confirms whether the subject vehicle has traveled to the vicinity of the end of the merging lane R3 based on the input travel environment information and the input road map information. If it is determined that the subject vehicle has traveled to the vicinity of the end of the merging lane R3, the travel control unit 26 proceeds to step S24. The subsequent processing sequence from step S24 and onward is as described above.

If it is determined in step S23 that the subject vehicle has not reached the vicinity of the end of the merging lane R3, the travel control unit 26 returns to step S19.

In step S14, for example, an obstacle may sometimes be confirmed near the end point of the merging lane R3. In this case, the obstacle may possibly be blocking the lane boundary line L1a at the roadside near the end point of the merging lane R3. In such a case, the normal lane-change control may be prioritized.

However, if an obstacle is confirmed near the end point of the merging lane R3 and the lane boundary line L1a is not identifiable when the set distance of the merging lane R3 is small (i.e., the situation in FIG. 4) or when the remaining distance Dx to the end of the merging lane R3 is small (i.e., the situation in FIG. 3), a process for switching to the manual driving mode may be performed after the stopping process in step S24 in FIG. 5.

According to the embodiment described above, the vehicle travel control device 1 that is to perform travel control during a lane change at a lane merging section performs merging travel control based on normal lane-change control if the distance D of the parallel segment of the merging lane R3 is sufficiently large (e.g., if D is 200 m or larger). On the other hand, if the set distance Da of the parallel segment of the merging lane R3 is small (e.g., if Da is smaller than 30 m) or if the remaining distance Dx to the end of the merging lane R3 is reduced due to, for example, a delayed merging timing to the main road caused by the surrounding conditions even with a large distance D set for the merging lane R3, the subject vehicle is made to travel to the vicinity of the end point of the merging lane R3 and subsequently undergoes lane-change control according to the shape of the merging lane R3.

Accordingly, the lane-change control is appropriately switched in accordance with the distance of the merging lane R3, so that even when the distance of the merging lane R3 is small (i.e., either one of the case of the distance Dx in FIG. 3 and the case of the distance Da in FIG. 4), merging can be performed with sufficient acceleration and sufficient determination time.

Therefore, the travel control device 1 according to this embodiment can constantly perform travel control safely and smoothly without bringing discomfort during a lane change at a lane merging section, and can also allow for efficient merging.

In the above-described embodiment, normal lane-change control is to be performed when the parallel segment of the merging lane extending parallel to the main road is sufficiently long. The normal lane-change control in this case involves executing a lane change when lane-change conditions, such as the surrounding conditions (e.g., nonexistence of another vehicle) and sufficient acceleration, are satisfied. Therefore, in this case, if the parallel segment of the merging lane is long, the lane change may possibly be performed at a midcourse segment of the merging lane.

However, depending on the country or region, a rule for traveling on a merging lane may be such that it is obligatory or recommended to travel to the vicinity of the end point of the merging lane regardless of the conditions surrounding the running vehicle.

In a country or region with such a rule, even if the parallel segment of the merging lane extending parallel to the main road is sufficiently long, the normal lane-change control may be performed by keeping the vehicle traveling on the merging lane as much as possible until the vehicle reaches the vicinity of the end point of the merging lane even in a case where safety around the vehicle is ensured and a sufficient vehicle speed is ensured by acceleration. On the other hand, in such a country or region, if the set distance of the merging lane is small or the distance to the end point of the merging lane is small, the lane-shape-based lane-change control may be executed similarly to the above-described embodiment.

In the above-described embodiment, the first threshold value Dth1 of 200 m and the second threshold value Dth2 of 30 m are set as threshold values used for changing the lane-change control. However, these numerical values are not limited to the examples described above and may be appropriately set in view of, for example, the traffic regulations in the country or region in which the vehicle is to be used.

The present disclosure is not to be limited to the above-described embodiment and permits various modifications and applications so long as they do not depart from the scope of the disclosure. Furthermore, the above-described embodiment includes various stages of the embodiment of the disclosure, and various embodiments of the disclosure may be extracted by appropriately combining a plurality of elements to be disclosed. For example, even when some elements are deleted from all the elements indicated in the above-described embodiment, if the problems to be solved by the disclosure can be solved and the advantageous effects of the disclosure can be achieved, the configuration with these elements deleted therefrom may be extracted as an embodiment of the disclosure. Moreover, components in different embodiments may be appropriately combined. The disclosure is not to be limited by a specific embodiment except that the disclosure is limited by the appended claims.

The travel control device 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the travel control device 1 including the locator unit 11, the IPU 21c, the front environment recognizer 21d, and the travel control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the travel control device 1 illustrated in FIG. 1.

The invention claimed is:

1. A vehicle travel control device comprising:
at least one processor; and
at least one machine readable tangible medium storing instructions that, when executed by the at least one processor, cause the at least one processor:
collect travel environment information of a first vehicle;
perform travel control of the first vehicle on a basis of the collected travel environment information; and
when the first vehicle traveling in is-a nonpriority lane performs a lane change to a priority lane into which the nonpriority lane is merged, perform a control based on lane boundary lines, wherein
the nonpriority lane includes a parallel segment extending parallel to the priority lane,
the lane boundary lines include:
a first lane boundary line indicating a boundary line between the priority lane and the nonpriority lane; and
a second lane boundary line including (i) a first portion extending parallel to the first lane boundary line at a position closer to a roadside than the first lane boundary line and defining the nonpriority lane along with the first lane boundary line, and (ii) a second portion extending diagonally from the first portion to the first lane boundary line to terminate the nonpriority lane,
the at least one processor is configured to:
execute, based on determining that a distance of a predetermined segment of the nonpriority lane is less than a first predetermined distance, a lane-shape-based lane-change control process; and
unexecute, based on determining that the distance of the predetermined segment of the nonpriority lane is greater than the first predetermined distance, the lane-shape-based lane-change control process, and
the lane-shape-based lane-change control process is a process causing the first vehicle to move along a target travel path from the nonpriority lane to the priority lane over the first lane boundary line such that the target travel path or a side surface in a vehicle width direction of the first vehicle that travels along the target travel path is parallel to the second portion of the second lane boundary line.

2. The vehicle travel control device according to claim 1, wherein the at least one processor is configured to identify a predicted time point at which the first vehicle is to pass through the target travel path in a traveling direction of the first vehicle on the basis of the collected travel environment information, and
wherein, when the at least one processor determines that a second vehicle is to hinder the first vehicle from pass through the target travel path at the predicted time point, the at least one processor is configured to perform deceleration control before the predicted time point is reached.

3. The vehicle travel control device according to claim 1, wherein the lane-shape-based lane-change control process includes obtaining the target travel path by parallel-shifting a curve line along at least a part of the second lane boundary line toward a center of the nonpriority lane.

4. The vehicle travel control device according to claim 1, wherein the predetermined segment is a parallel segment of the nonpriority lane extending parallel to the priority road, or a remaining segment from the first vehicle that travels in the parallel segment to an end of the parallel segment.

5. The vehicle travel control device according to claim 1, wherein the at least one processor is configured to execute, when the at least one processor unexecutes the lane-shape-based lane-change control process, a normal process that is a process causing the first vehicle to move along a target travel path from the nonpriority lane to the priority lane over the first lane boundary line without a shape of the second portion of the second lane boundary line.

6. A vehicle travel control device comprising:
 circuitry configured to
  collect travel environment information of a first vehicle,
  perform travel control of the first vehicle on a basis of the collected travel environment information, and
  when the first vehicle traveling in is-a nonpriority lane performs a lane change to a priority lane into which the nonpriority lane, perform a control based on lane boundary lines, wherein
 the nonpriority lane includes a parallel segment extending parallel to the priority lane,
 the lane boundary lines include:
  a first lane boundary line indicating a boundary line between the priority lane and the nonpriority lane; and
  a second lane boundary line including (i) a first portion extending parallel to the first lane boundary line at a position closer to a roadside than the first lane boundary line and defining the nonpriority lane along with the first lane boundary line, and (ii) a second portion extending diagonally from the first portion to the first lane boundary line to terminate the nonpriority lane,
 the circuitry is configured to:
  execute, based on determining that a distance of a predetermined segment of the nonpriority lane is less than a first predetermined distance, a lane-shape-based lane-change control process; and
  unexecute, based on determining that the distance of the predetermined segment of the nonpriority lane is greater than the first predetermined distance, the lane-shape-based lane-change control process, and
 the lane-shape-based lane-change control process is a process causing the first vehicle to move along a target travel path from the nonpriority lane to the priority lane over the first lane boundary line such that the target travel path or a side surface in a vehicle width direction of the first vehicle that travels along the target travel path is parallel to the second portion of the second lane boundary line.

\* \* \* \* \*